(12) United States Patent
Patwardhan et al.

(10) Patent No.: US 10,769,103 B1
(45) Date of Patent: Sep. 8, 2020

(54) EFFICIENT CONTENT INDEXING OF INCREMENTAL BLOCK-BASED BACKUPS

(71) Applicant: EMC IP Holding Company LLC, Hopkinton, MA (US)

(72) Inventors: Kedar Patwardhan, Irvine, CA (US); Rajesh Nair, San Jose, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 216 days.

(21) Appl. No.: 15/727,385

(22) Filed: Oct. 6, 2017

(51) Int. Cl.
*G06F 16/14* (2019.01)
*G06F 16/17* (2019.01)
*G06F 16/11* (2019.01)
*G06F 16/901* (2019.01)

(52) U.S. Cl.
CPC .......... *G06F 16/128* (2019.01); *G06F 16/113* (2019.01); *G06F 16/122* (2019.01); *G06F 16/14* (2019.01); *G06F 16/1734* (2019.01); *G06F 16/901* (2019.01)

(58) Field of Classification Search
CPC ..... G06F 16/128; G06F 16/14; G06F 16/1734
USPC ....................................................... 707/646
See application file for complete search history.

(56) References Cited

U.S. PATENT DOCUMENTS

| | | | | |
|---|---|---|---|---|
| 8,099,572 B1 * | 1/2012 | Arora | ..................... | G06F 13/28 707/640 |
| 8,126,847 B1 * | 2/2012 | Zheng | ................. | G06F 11/1469 707/640 |
| 8,849,777 B1 * | 9/2014 | Xing | ................... | G06F 11/1453 707/695 |
| 9,411,821 B1 * | 8/2016 | Patwardhan | ........ | G06F 11/1446 |
| 9,430,332 B1 * | 8/2016 | Bahadure | ............ | G06F 11/1451 |
| 9,645,892 B1 * | 5/2017 | Patwardhan | ........ | G06F 11/1464 |
| 2005/0246398 A1 * | 11/2005 | Barzilai | .............. | G06F 11/1448 |
| 2006/0259527 A1 * | 11/2006 | Devarakonda | ...... | G06F 16/1734 |
| 2009/0199199 A1 * | 8/2009 | Pooni | .................. | G06F 11/1453 718/105 |
| 2010/0293147 A1 * | 11/2010 | Snow | ...................... | G06F 16/10 707/640 |
| 2011/0078118 A1 * | 3/2011 | Kushwah | ............ | G06F 11/1451 707/646 |
| 2011/0264635 A1 * | 10/2011 | Yang | ................... | G06F 11/1402 707/695 |
| 2013/0339298 A1 * | 12/2013 | Muller | ................ | G06F 11/1415 707/640 |

(Continued)

*Primary Examiner* — Pierre M Vital
*Assistant Examiner* — Nargis Sultana
(74) *Attorney, Agent, or Firm* — Staniford Tomita LLP

(57) ABSTRACT

A first list is received including locations of blocks of a file system that changed between current and previous backups. A superblock of the file system is read to generate a second list including locations of metadata records representing file objects. The first and second lists are intersected to return a third list including locations listed in the first and second lists. The locations in the third list are changed metadata records. A metadata record as of the current backup and identified in the third list is read. A previous version of the metadata record as of the previous backup is read. The current and previous metadata record versions are compared to detect potential conditions occurring between the backups. Upon detection of a first type of condition, information about the condition is recorded. Upon detection of a second type of condition, information about the condition is not recorded.

15 Claims, 9 Drawing Sheets

(56) References Cited

U.S. PATENT DOCUMENTS

| | | | |
|---|---|---|---|
| 2015/0112939 A1* | 4/2015 | Cantwell | G06F 16/14 |
| | | | 707/646 |
| 2015/0254141 A1* | 9/2015 | Wertheimer | G06F 16/22 |
| | | | 707/646 |
| 2015/0293817 A1* | 10/2015 | Subramanian | G06F 11/1448 |
| | | | 707/645 |
| 2016/0140191 A1* | 5/2016 | Lu | G06F 16/2477 |
| | | | 707/722 |
| 2017/0060884 A1* | 3/2017 | Goodman | G06F 11/1461 |
| 2017/0262204 A1* | 9/2017 | Dornemann | G06F 3/065 |
| 2018/0004606 A1* | 1/2018 | Iwasaki | G06F 11/1451 |

* cited by examiner

US 10,769,103 B1

EFFICIENT CONTENT INDEXING OF INCREMENTAL BLOCK-BASED BACKUPS

TECHNICAL FIELD

Embodiments are generally directed to data storage operations, and more specifically to facilitating content indexing of block-based backups.

COPYRIGHT NOTICE

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND

Traditional file system backups generally require reading through each file record in the file system and identifying when each corresponding file was last modified to determine whether a file should be backed up. Specifically, if the last time a file was modified happens to be after the time of the previous backup, the contents of the file are read and backed up. A file system on a volume, however, may contain many millions of files and thus many millions of file records to review. Thus, the time to complete a backup can be very lengthy as the backup process requires checking the last modified date of every file to determine whether or not the file should be included in the backup. Indeed, even if none of the files were modified, the file records would still need to be read in order to conclude that none of the files were modified.

Block-based backups offer a new approach. In a block-based backup system, the backup system tracks which blocks are modified and these blocks are then backed up at a next backup that may be referred to as an incremental backup. A block-based backup can thus be completed much faster than traditional file system backups that require reading the entire file system to determine whether a file needs to be included in a backup. Once a block-based backup has completed, however, there still exists a need to discover the mapping between the backed up blocks and their corresponding files. This mapping is needed so that the backup can be indexed as to what files were included in the backup, what files changed since a last backup, what content in the file was changed, and so forth. Backups are generally not very useful if they are not searchable. This discovery process, however, can be extremely time-consuming and resource-intensive as there may be many millions upon millions of records to review for each completed backup in order to index each backup.

Thus, there is a need for improved systems and techniques to quickly and efficiently identify files and file changes between incremental block-based backups.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, Data Domain Restorer, and Data Domain Boost are trademarks of Dell EMC.

BRIEF DESCRIPTION OF THE FIGURES

In the following drawings like reference numerals designate like structural elements. Although the figures depict various examples, the one or more embodiments and implementations described herein are not limited to the examples depicted in the figures.

DETAILED DESCRIPTION

Figure 1:
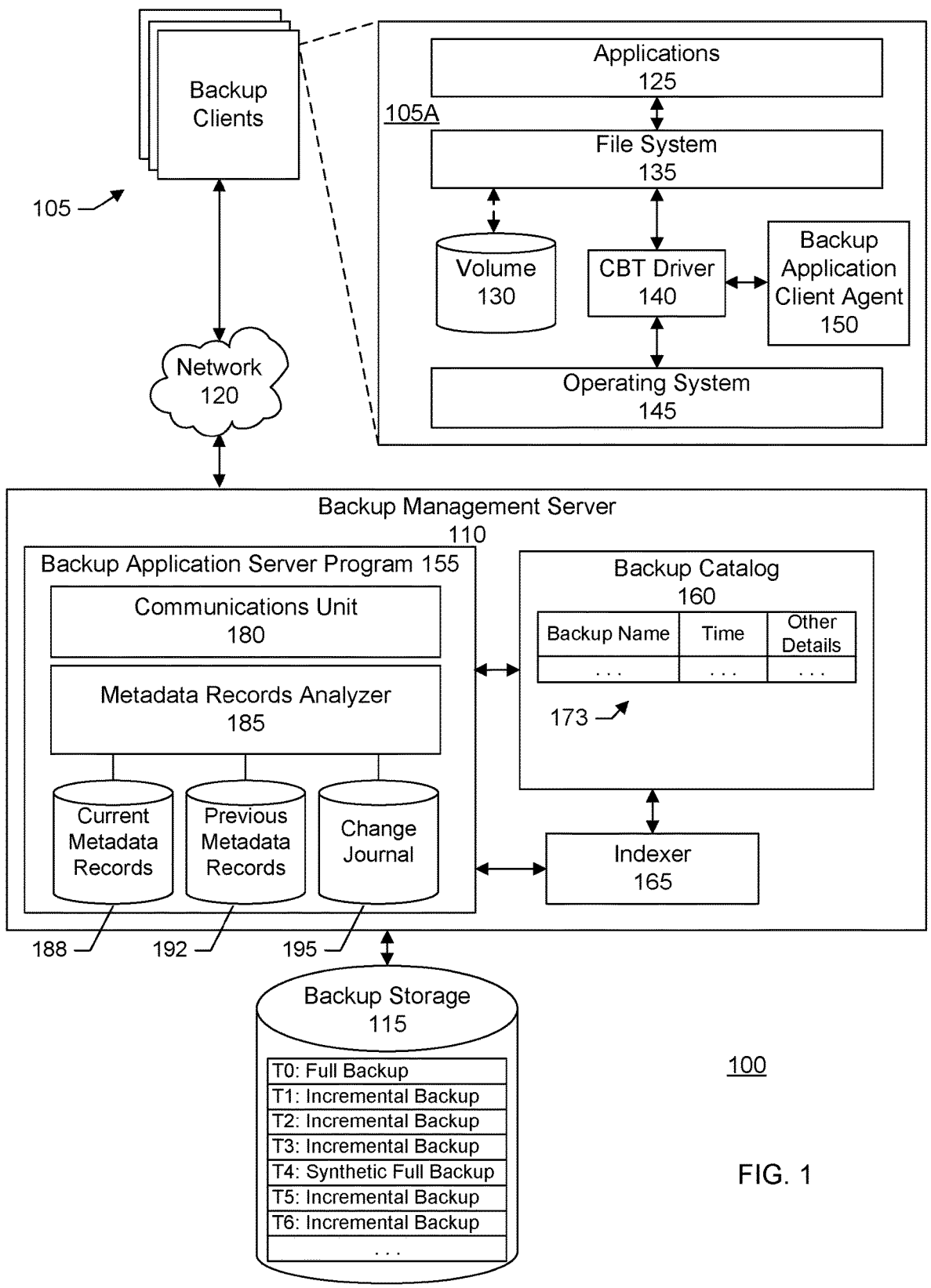
FIG. 1 is a diagram of a large-scale network implementing a system to facilitate forever incremental content indexing of forever incremental block-based backups, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a non-transitory computer-usable medium having a computer-readable program code embodied therein. In the context of this disclosure, a non-transitory computer-usable medium or computer-readable medium may be any physical medium that can contain or store the program for use by or in connection with the instruction execution system, apparatus or device. For example, the non-transitory computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer (e.g., processor of the computer), the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Disclosed herein are methods and systems to facilitate indexing contents of a block-based backup (also referred to as an image backup) of a file system image. Typically, customers use block-based backups of a volume (containing a file system) as the method allows for a fast backup, such as a "forever incremental." A "forever incremental" refers to a backup technique where the initial backup is a full backup and, afterwards, there is an ongoing (e.g., "forever") sequence of incremental backups. Forever incremental backups can reduce backup window times, conserve computing resources on the backup clients and servers, and reduce the amount of data transmitted across the network. However, such backups are invariably not indexed in the sense that the contents of the backup are not known. For a backup to be truly useful for content discovery (e.g., electronic or e-discovery) or for quick browsing it is absolutely important to know which files are present in a backup as well as know which files changed between backups (e.g., between incremental backups or between a full backup and subsequent incremental backup).

Content-indexing a block-based backup by mounting the volume and content indexing each and every file in the mounted volume, in addition to be being inefficient also consumes vast amounts of CPU processing cycles, and I/O (input/output) bandwidth, making it extremely ineffective.

Generally, block-based backups are the de-facto method of backing up virtual machines (VMs) as well as file systems as the process is deterministic, fast, efficient and provides a forever incremental backup solution. However, one of the main drawbacks of this method is that the backup is no longer indexed/content-indexed on the backup media server. Not being able to index backup contents is a severe limitation and makes the backup useless for e-discovery and other use cases. The current art for content-indexing a block-based backup is unwieldy and inefficient for data centers having thousands of VMs getting backed-up every day.

In a specific embodiment, systems and techniques are described for a unique forever-incremental method of facilitating indexing a forever incremental block-based backup that reads only the changed blocks of a current backup, does not require creating and maintaining a database storing intermediate results of any sort (like say, mapping file blocks to their inode/MFT records), and is thus several orders of magnitude faster and efficient. The number of blocks read for indexing the backup is purely proportional to the number of files changed, which is quickly identified from the changed blocks themselves, without having to read all the inodes/MFT records.

In a specific embodiment, systems and techniques are provided for quickly identifying only the changed files between incremental block-based backups of a volume containing a file system and then content indexing the changed files. Given that in many cases, an incremental block-based backup contains only about a 1 percent change with respect to the previous backup, we can statically consider the 1 percent of changes to correspond to 1 percent (or less) changed files and upon identifying the so changed files, content index them. In some cases, this can reduce the indexing overheads by at least a 100 times in the given example. In an embodiment, the technique does not require creating and maintaining any database of intermediate results such as, for example, mapping data blocks (e.g., extents) to their parent inode number/MFT (Master File Table) records.

Some embodiments of the invention may involve a distributed system, such as a very large-scale wide area network (WAN), metropolitan area network (MAN), or cloud-based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

FIG. 1 illustrates a simplified block diagram of a computing environment 100 that implements one or more embodiments of a system for facilitating content indexing of a block-based incremental backup of a volume having a file system. The environment shown in FIG. 1 includes any number of clients 105, a backup management server 110, and a backup storage repository 115, each of which are interconnected by a network 120.

The network provides connectivity to the various systems, components, and resources of the distributed computer network shown in FIG. 1. The network may be implemented using protocols such as Transmission Control Protocol (TCP) and/or Internet Protocol (IP), well known in the relevant arts. In a distributed network environment, the network may represent a cloud-based network environment in which applications, servers and data are maintained and provided through a centralized cloud computing platform. In an embodiment, the system may represent a multi-tenant network in which a server computer runs a single instance of a program serving multiple clients (tenants) in which the program is designed to virtually partition its data so that each client works with its own customized virtual application, with each virtual machine (VM) representing virtual clients that may be supported by one or more servers within each VM, or other type of centralized network server.

The data generated within system 100 may be stored in a backup media of the backup storage repository. The backup media may be located at any number of persistent storage locations and devices, such as local client storage, server storage, or network storage, which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices, such as large capacity tape or drive (optical or magnetic) arrays. In an embodiment, the target storage devices, such as tape or disk array may represent any practical storage device or set of devices, such as tape libraries, virtual tape libraries (VTL), fiber-channel (FC) storage area network devices, and OST (OpenStorage) devices. In a specific embodiment, however, the target storage devices represent disk-based targets implemented through virtual machine technology.

In an embodiment, system 100 may represent a Data Domain Restorer (DDR)-based deduplication storage system, and the backup storage server having backup media may be implemented as a DDR Deduplication Storage server provided by Dell EMC of Hopkinton, Mass. However, other similar backup and storage systems are also possible. System 100 may utilize certain protocol-specific namespaces that are the external interface to applications and include NFS (network file system) and CIFS (common internet file system) namespaces, as well as a virtual tape library (VTL) or DD Boost provided by Dell EMC. In general, DD Boost (Data Domain Boost) is a system that distributes parts of the deduplication process to the backup server or application clients, enabling client-side deduplication for faster, more efficient backup and recovery. A data storage deployment may use any combination of these interfaces simultaneously to store and access data. Data Domain (DD) devices in system 100 may use the DD Boost backup protocol to provide access from servers to DD devices. The DD Boost library exposes APIs (application programming interfaces) to integrate with a Data Domain system using an optimized transport mechanism. These API interfaces exported by the DD Boost Library provide mechanisms to access or manipulate the functionality of a Data Domain file system, and DD devices generally support both NFS and CIFS protocol for accessing files.

The clients and servers can be general purpose computers with software and hardware. The hardware may include a processor, memory, storage (e.g., hard disk), input/output (I/O) controller, network interface, display or electronic screen, input device, and other computing components, each of which may be interconnected by a bus architecture or any interconnection scheme. The software may include an operating system, application programs, services, daemons, drivers, file system device drivers, file system libraries, code modules, and other software components. Examples of operating systems include the Microsoft Windows® family of operating systems (e.g., Windows Server), Linux, HP-UX, UNIX, Sun OS, Solaris, Mac OS X (e.g., Macintosh), Alpha OS, AIX, IRIX32, or IRIX64. Other operating systems may be used. Communications among the components may be via a communication protocol interface or application program interface (API) or messaging system.

A client may be referred to as a backup client, host, host computer, or node. A client, such as a client 105A, may host any number of applications 125 including virtual machines. Examples of applications include word processing applications, mail applications, database applications, collaboration applications, and many others. A virtual machine is a software abstraction of a physical computing machine. A client host uses virtualization software to create and host any number of virtual machines. A client host may host dozens, hundreds, or even thousands of virtual machines. The client further includes a volume 130 formatted with a file system 135, a change block tracking (CBT) driver 140, an operating system 145, and a backup application client agent 150.

The file system includes logic and data structures to help organize, track, and group the data stored on the volume into, for example, files. The operating system uses the file system to keep track of files that may be accessed, generated, modified, created, or used by the applications. For example, an application may issue through an interface or application programming interface (API) of the file system requests for file system operations such as opening a file, closing a file, writing to a file, creating a new file, deleting a file, renaming a file, copying a file, and so forth.

The CBT driver may be integrated with the operating system or positioned between the file system and operating system. The CBT driver is responsible for intercepting writes to the volume and tracking changes at the block-level to the volume. In other words, the CBT driver monitors in the background which blocks are overwritten so that these blocks can be backed up in a next backup.

Specifically, the CBT driver tracks writes issued by the application through the file system to the volume. The CBT driver records the block locations or other identifiers for blocks that have changed since a previous or last backup. In other words, the CBT driver monitors the file system for changes to blocks between backup intervals. The changed blocks may be listed or otherwise identified in a changed block list or log. For example, a set of changed blocks may be identified by its starting block location (e.g., offset) and length. The changed block list may include a bitmap having a bit for each block of the volume. When a block is changed, a value for a bit corresponding to the block may be set, flagged, or otherwise marked to indicate that the block changed.

The changed block list may be stored locally at the client such as in-memory or on disk. The changed block list may be transmitted from the client to the backup management server. In a specific embodiment, when the time for a backup has arrived, the backup application server program instructs the backup application client agent to perform a backup. The backup application client agent, in turn, obtains from the CBT driver a listing of blocks that have changed since a previous backup. The backup client agent can review the list and select those changed blocks that should be read and transmitted to the backup storage server during the backup. During an initial backup of the file system, all blocks may be read and transmitted for backup. The CBT may then begin tracking the blocks for the subsequent incremental backups. During a next incremental backup only blocks that have changed since a previous or last backup according to the CBT may be transmitted to the backup management server (or backup storage repository).

The backup management server includes a backup application server program 155, a backup catalog 160, and an indexer 165. The backup application server program coordinates with the various backup client agents to backup (and recover) data from the various clients. For example, there can be a predetermined schedule maintained by the backup application server program. At the scheduled time, the backup application server program can instruct the relevant client backup agents to begin the backup jobs or operations. Alternatively, a backup may be initiated on-demand by a backup administrator through a management console graphical user interface (GUI) or command line interface (CLI) of the backup application.

The catalog provides an index of the data stored in the backup storage repository. The backed up data may be stored within a logical entity that may be referred to as a saveset. The catalog may include metadata 173 associated with the various backups including the current or most recent backup and previous backups. The metadata may include a name of the backup, the time and date of a backup, identifications (e.g., file names) of the files stored in the backup storage repository for a particular backup, size of a backup, path information, identification of the source volume or client from which the data was backed up, events and event details that may have occurred between backups (e.g., file changes or modifications, new file added, existing file deleted, and so forth), listings of blocks as provided by the CBT driver and backed up during the various backups, and the like.

In a specific embodiment, the backup application server program includes a communications unit 180 and metadata records analyzer 185. The communications unit is responsible for handling communications between the backup application server program, the backup clients, indexer, and other components of the system.

The backup storage repository stores the data backed up from the various clients. As shown in the example of FIG. 1, in an embodiment, an initial backup at a time T0 includes a full backup. The full backup includes a complete copy of data on a client as of time T0. Thereafter, there can be an ongoing sequence of incremental backups in which only blocks that have changed since a last backup according to the CBT are copied from the client to the backup storage repository. For example, an incremental backup of the client at a time T1 may include only blocks that have changed since a last backup at time T0. An incremental backup of the client at a time T2 may include only blocks that have changed since a last backup at time T1. An incremental backup of the client at a time T3 may include only blocks that have changed since a last backup at time T2. And so forth. At a time T4, for example, a synthetic full backup may be created by assembling or merging the blocks from the previous full and incremental backups. For example, there can be a policy specifying creating synthetic full backups at monthly intervals or other user-specified interval.

In other words, on day 1 all blocks of a source volume on a client may be backed up to form a complete initial backup image. Thereafter, for each incremental backup, only blocks that have been modified as of a last backup are backed up. These backups may be stored separately from each other as incremental backup images. Thus, each incremental may include a percentage of the number of blocks backed up during the initial full backup. The percentage may be about 1 percent, but may vary greatly depending upon factors such as the amount of time between backups, frequency of changes, and so forth. At some point in time a backup image may be created by reading a block from the initial backup image (provided the block was not modified throughout each of the previous incremental backups) or by reading the block from the latest incremental image in which the block was modified. Maintaining backups requires storage space. Thus, an organization may implement a retention policy in which only a certain number of backups are maintained.

The metadata records analyzer includes logic for analyzing metadata records of the file system. The metadata records are associated with or represent file objects in the file system. A metadata record includes a data structure that stores metadata (e.g., file attributes or properties) about a particular file object. In an embodiment, each file object in the file system is associated with a metadata record. It should be appreciated that the components of the system shown in FIG. 1 can be functional entities where the implementation of the functions may vary. For example, in some cases the communications unit and metadata record analyzer are combined into one code module. In other cases, the components reside in separate code modules.

Figure 2:
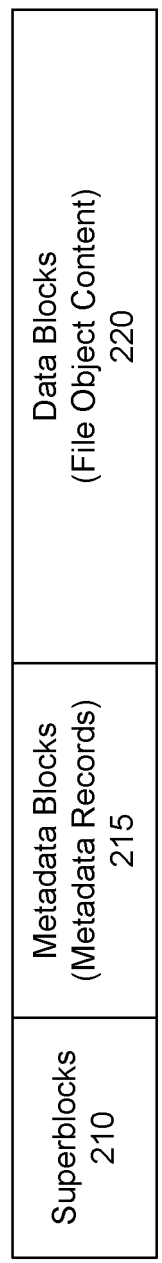
FIG. 2 shows a simplified block diagram of a file system layout on a volume.

FIG. 2 shows a simplified block diagram of a file system layout 205 of a volume. In the example shown in FIG. 2, the layout includes a set of blocks 210 that may be referred to as superblocks, a set of blocks 215 that may be referred to as metadata records or metadata blocks, and a set of blocks 220 that may be referred to as data blocks or content blocks. In brief, the actual content of a file object is stored in one or more data blocks. The file object, in turn, is associated with a metadata record or metadata block that stores metadata about the file object. This metadata record or metadata block is stored separately from the data blocks. The file metadata may be stored in a block that is separate from a block storing content of the file. A metadata record may be referred to as a file control block, MFT record, inode, or file record.

The superblocks are typically located in a fixed position in a zone or region at the beginning of the file system. The superblocks store volume details. These details may include the total number of blocks in the volume, number of free blocks, block size, and locations of the metadata records (or metadata blocks or file records) on the volume. The locations may be specified as various ranges of blocks (e.g., starting block number and ending block number). The superblocks may be referred to as volume control blocks or master file table. Thus, when a device formatted with the file system is mounted, the superblocks are read to discover the locations of the metadata kept by the file system.

Figure 3:
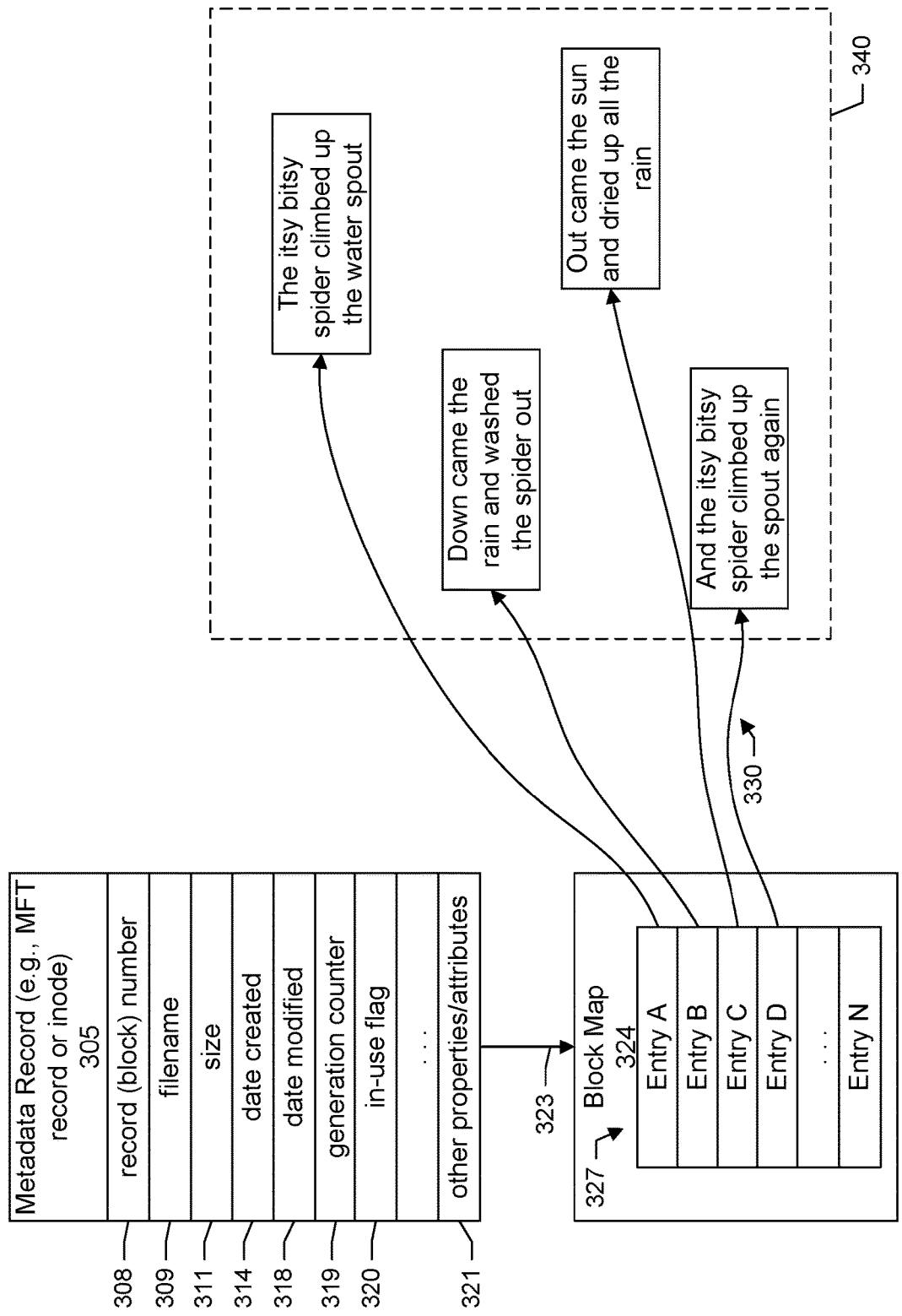
FIG. 3 shows a data structure example of a metadata record.

More specifically, FIG. 3 shows a block diagram of a metadata record 305. Some specific examples of metadata records include inodes as provided in the Linux file system, and Master File Table (MFT) records as provided in NTFS (New Technology File System) from Microsoft Windows. A metadata record may be referred to as a file control block or file record. When a file is created in the file system, the file entry or file name is stored in a corresponding metadata record or metadata block. The metadata record describes the file and further stores other file attributes or properties such as the permissions for the file, owner of the file, and the like. A metadata record represents a file and further includes information identifying the blocks where data for that file resides.

The example of the metadata record shown in FIG. 3 includes a record number 308, filename 309, size 311, date created 314, date modified 318, generation counter 319, an in-use flag 320, and other attributes 321 (e.g., file owner, access control lists (ACL), permissions (e.g., create, access, or write)). The metadata record further includes entries, pointers, or may reference 323 a block map 324. The block map identifies one or more data blocks associated with the metadata record in which the actual file content is stored.

The record number field uniquely identifies the metadata record from among other metadata records in the file system. The filename field stores a name of a file object represented by the metadata record. The date created field stores a timestamp indicating the time and date the file object was created. The date modified field stores a timestamp indicating the time and date the file object, metadata stored in the metadata record, or both was last modified.

The generation counter field stores a counter value to help distinguish between removed (e.g., deleted) files and new files. More particularly, when a file is removed or deleted, a metadata record associated with the now-deleted file may be reused for a new file. In order to differentiate between a deleted file and a new file where the new file is associated with a metadata record that was previously associated with the deleted file, each metadata record contains a "generation" counter. The generation counter of a metadata record is incremented when a file corresponding to the metadata record is deleted. In an embodiment, when a metadata block is erased (as after a file deletion) all record fields in the metadata record except the generation count may be erased (or otherwise marked as available) and the generation count is incremented. The generation count helps to ensure that a metadata record that represents a new file object (e.g., "file1") can be differentiated from a previous file object (with the same name, "file1") as the generation counter would be different in both the records.

In other words, a metadata record for "file1" may include a generation counter having a first value as of a first time. When, at a second time, "file 1" is deleted, the generation counter is incremented to a second value, different from the first value. At a third time, after the first and second times, a new file (e.g., "file 1") may be created and be represented by the metadata record that was previously representing the old "file1" at the first time. However, the generation counters will be different. That is, the generation counter in the current version of the metadata record as of the third time will be the second value. The generation counter in the previous version of the metadata record as of the first time will be the first value.

The in-use flag field stores an indicator indicating whether or not the metadata record is currently in-use. That is, whether or not the metadata record is currently representing or is associated with a file object.

As shown in the example of FIG. 3, a metadata record further includes identifications or locations of one or more data blocks 340 storing the actual content of a file object represented by the metadata record. In particular, the metadata record may reference 323 a block map 324. The block map includes a set of entries 327 storing location information or addresses mapping 330 the metadata record to one or more data blocks storing content of a file object represented by the metadata record.

For example, the location information may specify the offsets and corresponding lengths where the data blocks reside within the file system layout on the volume, block locations, block identifiers, or any other block identification information to identify the data blocks storing the content of the file object. In other words, the file's content may be stored in one or more data blocks; and a metadata record or metadata block for the file may store file attributes (e.g., file name, permissions, last modified timestamp, generation counter) and a mapping between the file and its one or more data blocks. Consider, as an example, a file having a size of 1 megabyte (MB) and which then occupies ten blocks. The metadata record stores the locations for each of those ten blocks. The metadata record may store a name of a file, index number of a parent, and block numbers of each data block corresponding to the file.

Referring back now to FIG. 1, in a specific embodiment, the metadata records analyzer obtains a listing of changed blocks according to the CBT driver for a current or most recent backup, identifies metadata records 188 from the current backup (which may be referred to as current version metadata records), metadata records 192 as of a previous or last backup (which may be referred to as previous version metadata records), compares the two different metadata record versions, identifies, based on the comparison, file objects in the file system included with the current backup such as file objects that have changed between the current and previous backups, and (if appropriate) records information about the changes in a change journal 195.

Table A below shows an example of information that may be recorded in the change journal.

TABLE A

| Filename | Metadata Record | Data Blocks | Event Description |
|---|---|---|---|
| nursery-rhymes.doc | 88 | 103, 104, 109 | new file created |
| happy-days.xls | 25 | 112, 113, 114, 115, 116 | file data modified; modified data at blocks 114 and 115 |
| work-mail.edb | 22 | 120-133; 150-200 | file deleted |
| home-mail.edb | 18 | 142, 201, 202 | metadata only change; previous file name = original-mail.edb |
| ... | ... | ... | ... |

In the example shown in table A above, a first column lists a file name of a file object. A second column lists a metadata record corresponding to the file object. A third column lists the block identifiers from the metadata record storing content of the file object. A fourth column lists the event that occurred between the previous and current backups.

Input to the metadata records analyzer such as the listing of changed blocks of a current backup, versions of metadata records from the current backup, versions of the metadata records as of a last or previous backup, and the like may be obtained by querying a backup client, retrieving the information from the backup catalog, or other central location, or combinations of these.

Identifying the changes may include recording in the change journal an identification of the file (e.g., filename), and the type of change that was detected or discovered (e.g., determining that a file was modified, created, or deleted). In the case of a modification to a particular file, the metadata records analyzer may further record in the change journal the data blocks or ranges of the data blocks associated with the particular file that changed. The journal may then be provided to the indexer to index the changed contents of the particular file. The indexed contents may be used to augment the backup catalog with additional details on what was included in a backup or what changed between backups.

Typically, content indexing a block-based backup requires that the block-based backup be mounted and then re-indexed for each and every file in the backup. This process is CPU and I/O intensive and can easily degrade the backup media, which is generally not designed to serve intense random reads. Further, reindexing a block-based backup is not efficient as most of the time I/O may be spent reindexing files that were already indexed in some previous backup.

In a specific embodiment, systems and techniques are provided to exploit the correlation between changes to blocks in a file system versus updated time stamps on metadata records (e.g., inodes or MFT records) of the file system. Whenever a file system makes changes to a file, it also updates the "modified" time stamp on the metadata record (e.g., inode or MFT record) of the concerned file. Creating block-based backups of a file system generally requires the backup agent to:

1) Quiesce the file system;
2) Take a snapshot of the volume containing the file system; and
3) Resume I/O activity on the original volume.

The block-based backup is then created from the snapshot volume. An important point to note here is that, as part of step (1) above, the file system commits to disk all in-flight as well outstanding (dirty) changes to the file system. This results in flushing all file system dirty data/metadata to disk including the "modified" time stamp on all affected inode(s) (or MFT record(s)).

In a specific embodiment, a technique involves extracting location information of inodes or MFT records (which is not the same as or is different from reading the inodes/MFT data or even the block map entries of the inodes/MFT records) to identify the regions on disk where inodes/MFT records exist and then after obtaining the set of such inode/MFT locations, computing the intersection of inode/MFT location map with the list of changed blocks. This technique avoids having to trawl the block-map of each and every single file in the file system and is thus extremely efficient.

Table B below shows an overall flow for efficiently detecting file changes to a file system between block-based backups of the file system.

TABLE B

| Step | Description |
|---|---|
| 1 | Quiesce any application (if any) that may be using the file system to be backed up. |
| 2 | Quiesce the file system itself whose block-based incremental backup is to be obtained. |
| 3 | Note the time of quiesce and use it to tag the block-based backup in backup media. |
| 4 | Consult the Changed Block Map and read all the changed blocks (since the previous backup) and store an incremental backup of the volume. |
| 5 | Resume the quiesced file system and application (if any). |
| 6 | The block-based backup is, at this point, complete but un-indexed. At this point, we extract the location of all the metadata records (e.g., inodes or MFT records) in the current backup by reading the inode list file on Unix file systems (and MFT file on Windows). Only those inodes (or MFT records) that correspond to locations marked as modified in the CBT map need to be read. These inodes are hereafter referred to as modified inodes. All other inode locations can be immediately discarded without even reading them. This step itself results in a huge performance improvement. |
| 7 | Obtain the block-map of each modified inode (or MFT record), which reveals the location of the data blocks of the concerned file in the volume. |
| 8 | The intersection of the block-map of each modified inode with the CBT of the volume can be used to obtain the changed regions of each modified file. |
| 9 | At this point, an indexer can index either the changed files in their entirety or the changed regions of the changed files very efficiently. |
| 10 | Those regions of the CBT that do not correspond to the block-map of any modified file, correspond to changed file system metadata and can be safely ignored for the purposes of content-indexing the backup. |
| 11 | By comparing regions of modified inodes to their previous contents, we can also detect files that were removed between the two backups. |

Figure 4:
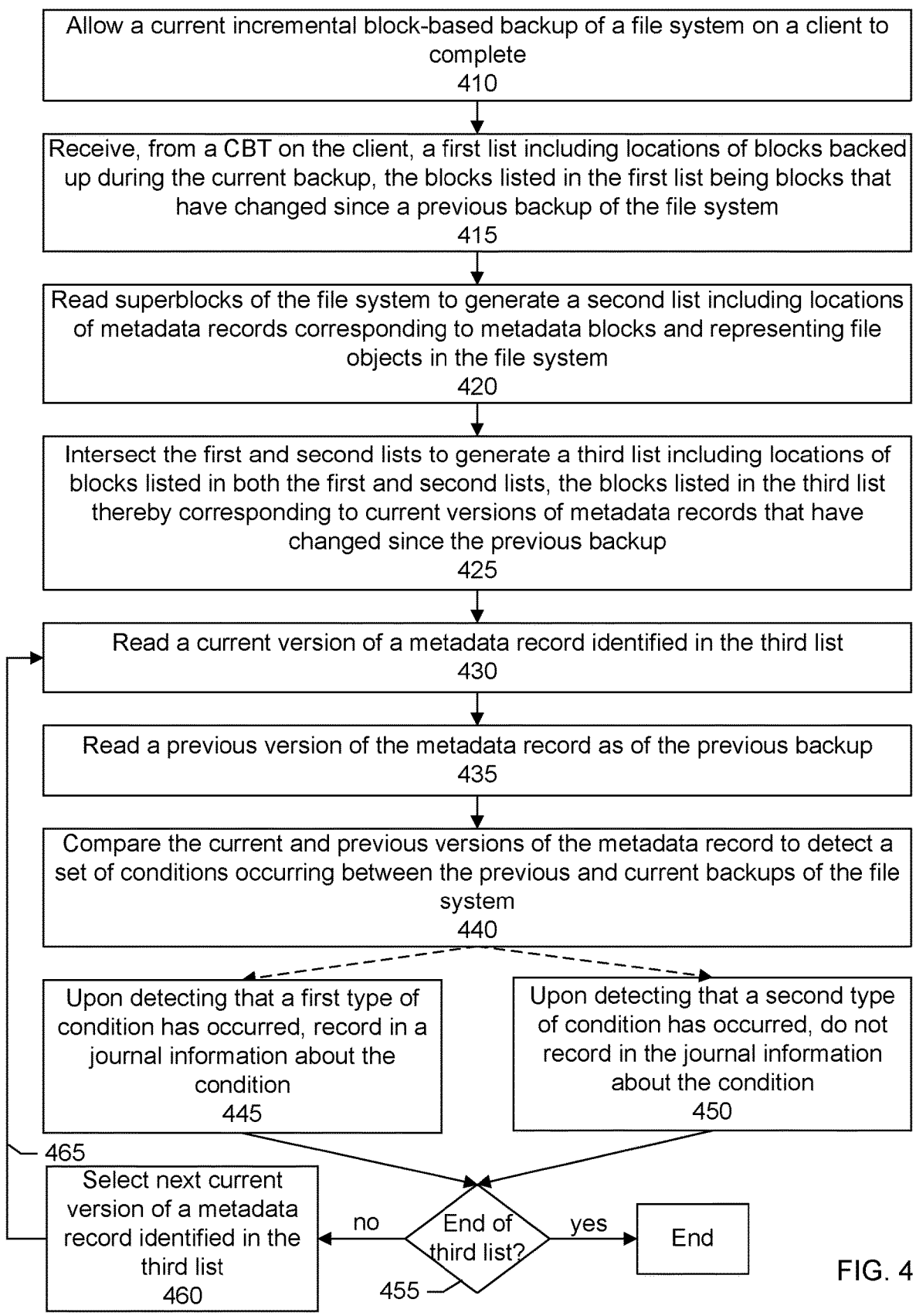
FIG. 4 shows an overall flow of a process for facilitating forever incremental content indexing of forever incremental block-based backups, under some embodiments.

FIG. 4 shows another flow for detecting file changes to a file system between block-based backups. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In a step 410, an incremental block-based backup of a file system on a client is allowed to complete. The backup may be referred to a current or most recent backup. In a step 415, the metadata records analyzer receives, from a CBT driver on the client, a first list including locations of blocks that changed or were backed up during the current backup. The blocks listed in the first list are therefore blocks that have changed since a previous backup of the file system. In other words, the blocks listed in the first list are the blocks that have changed between the previous and current backup. The previous backup may be a backup immediately before the current or most-recent backup.

Figure 5:
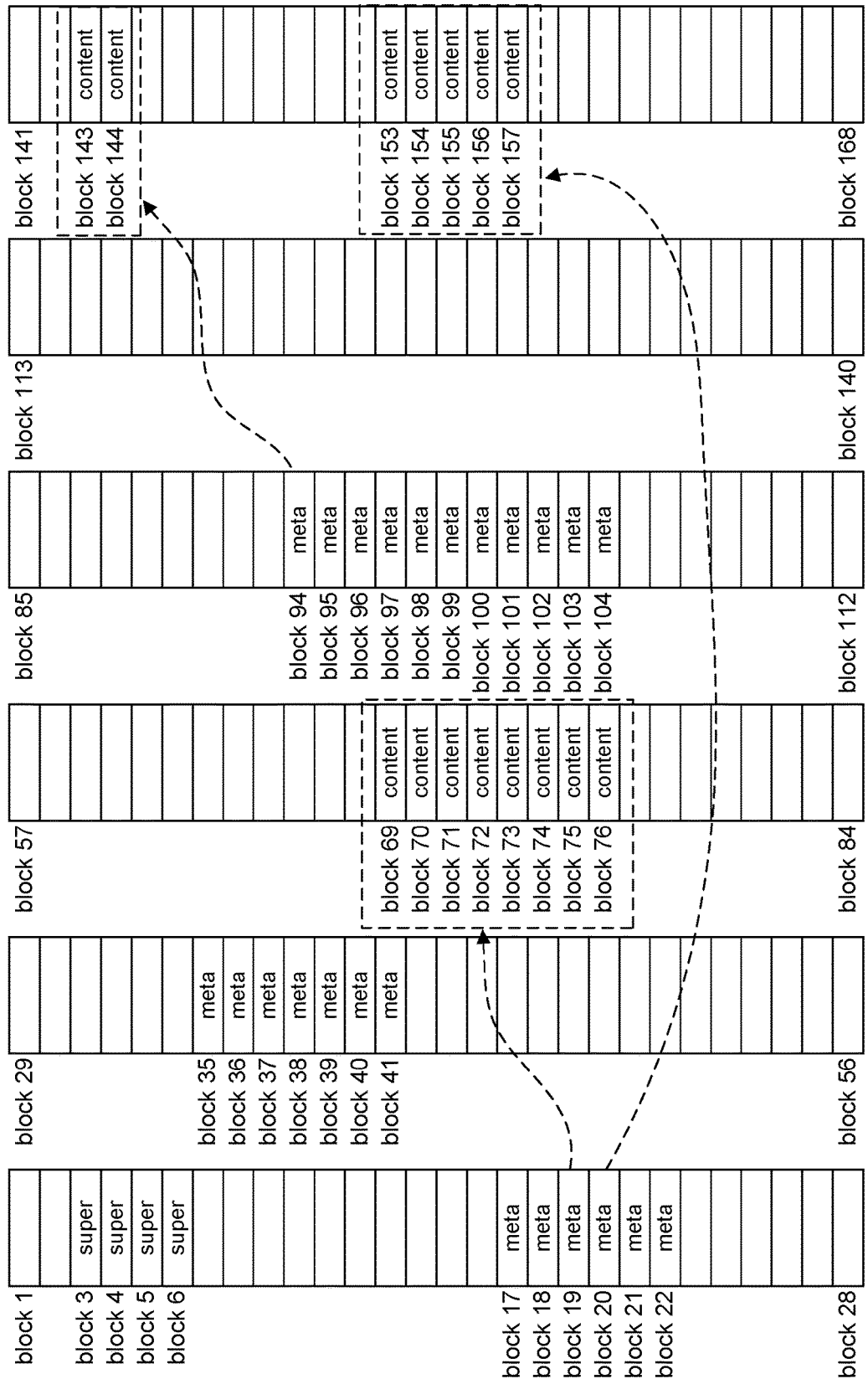
FIG. 5 shows a more detailed layout of blocks of a file system as of a first time.

For example, FIG. 5 shows a more detailed block diagram of a file system layout 505 of a volume. The file system is shown at a first point-in-time that corresponds to or is immediately after a first backup. The first backup may have been a full or incremental backup. In the example shown in FIG. 5, the file system includes 168 blocks. These blocks are continuous from block 1 to block 168 but have been divided into 6 columns so that they can fit on the drawing page. It should be appreciated that the layout shown in FIG. 5 is merely for purposes of illustration. A file system may include many millions or billions of blocks. The size of a block may be about 4096 bytes, but may vary depending upon factors such as the number of files the administrator expects to store. For example, the administrator may configure the file system with smaller block sizes (e.g., 1024 or 2048 bytes) if the administrator expects there to be many small files in order to use disk space efficiently.

As shown in the example of FIG. 5, blocks 3-6 are superblocks; blocks 17-22, 35-41, and 94-104 are metadata blocks; and blocks 69-76, 143-144; and 153-157 are data or content blocks. As discussed above, the superblocks store information indicating the size of the volume, information identifying the metadata blocks or records, size and location of the metadata records, and other volume details (e.g., usage information). Thus, in this example, the superblocks indicate a size of the volume as being 168 blocks and identify the locations of the metadata blocks as being blocks 17-22, 35-41, and 94-104.

A metadata block, in turn, identifies the locations of one or more data blocks storing the actual file content of a file object represented by the metadata block. Thus, for example, metadata block 19 may represent a first file in which the content of the first file is stored in data or content blocks 69-76. Metadata block 19 may include the block locations of, or references or pointers to data blocks 69-76. As another example, metadata block 20 may represent a second file in which the content of the second file is stored in data or content blocks 153-157. Metadata block 20 may include the block locations of, or references or pointers to data blocks 153-157. As another example, metadata block 94 may represent a third file in which content of the third file is stored in data or content blocks 143-144. Metadata block 94 may include the block locations of, or references or pointers to data blocks 143-144; and so forth.

During an initial full backup, all 168 blocks may be backed up (e.g., transmitted from the client to backup storage). Thereafter, the CBT driver can begin tracking blocks that change so that a next backup can be an incremental backup in which only blocks that have been modified or changed or new since the last backup are backed up (e.g., copied from the client to the backup storage).

Figure 6:
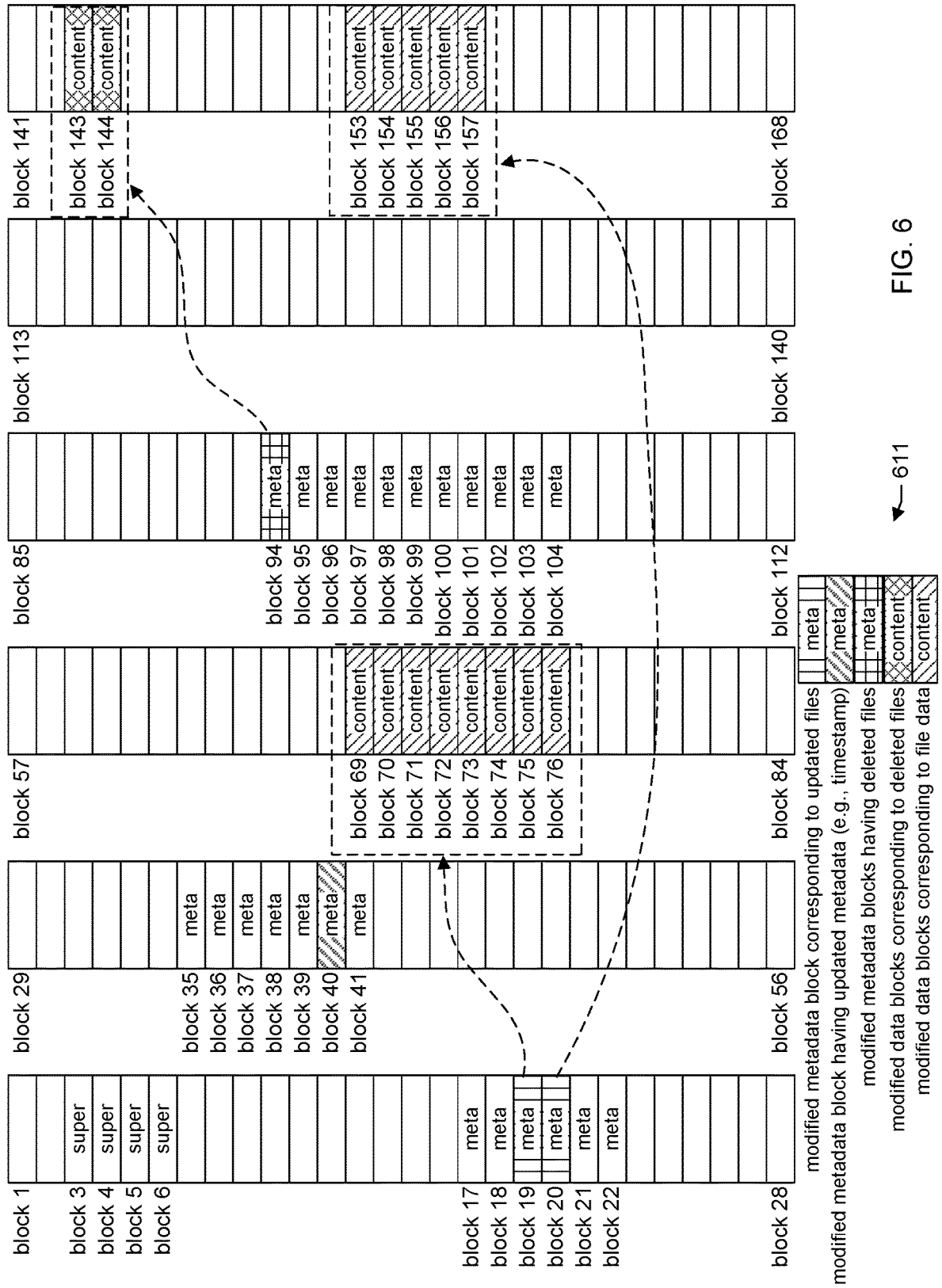
FIG. 6 shows a more detailed layout of blocks of the file system as of a second time, after the first time, in which changes to the blocks have been made since the first time.

FIG. 6 shows the file system shown in FIG. 5 at a second point-in-time, after the first point-in-time. The second point-in-time corresponds to a time of a second backup. The second backup may be referred to as a current or most-recent backup. The first backup may be referred to as a previous backup or last backup before the current backup. In FIG. 6, some of the blocks are shown with fill patterns to indicate that these particular blocks have changed since the previous backup (e.g., first backup—see, e.g., FIG. 5).

Specifically, according to the example in FIG. 6, blocks 19, 20, 40, 69-76, 94, and 153-157 have changed and, as such, are reported by the CBT driver (step 415-FIG. 4). Note that blocks 143 and 144 have not been modified and instead the corresponding file object has been deleted.

The CBT driver, however, may not provide any details on the changes such as whether the changed block was a metadata block, whether the changed block was a data block, a mapping of changed data blocks to their corresponding files, what changed, and so forth.

The listing of blocks received from the CBT driver may thus include a mix of blocks including metadata blocks that changed and data blocks that changed, but no details on the changes and no identification of whether the changed block was a metadata block or data block.

There can be a variety of conditions under which the CBT driver registers a block as having been changed. Consider, as an example, that block 19 is a metadata block that references blocks 69-76. Blocks 69-76 are data blocks storing file data for a file object represented by metadata block 19. In this example, the file data in blocks 69-76 have been updated. Thus, blocks 69-76 will be registered by the CBT driver. The update will be accompanied by a timestamp update to metadata block 19 to indicate the time and date of the file data modification. Thus, block 19 will likewise be registered by the CBT driver.

As shown in a legend 611, these change details to the blocks are shown in FIG. 6 using a fill pattern having vertical lines and a fill pattern having diagonal lines slopping to the left. Specifically, block 19 is shown with a fill pattern having vertical lines to indicate that it is a modified metadata block that corresponds to an updated file. Blocks 69-76 are shown with a fill pattern having diagonal lines slopping to the left to indicate they are modified data blocks corresponding to file data. It should be appreciated that the data blocks of a file may not necessarily be contiguous as shown in FIG. 6. Thus, a metadata record may include multiple entries describing various non-contiguous block locations.

Consider, as another example, that block 40 is a metadata block and the user has made an update to one or more file attributes stored in the metadata block, but has not made any changes to the actual file content stored in one or more data blocks referenced by metadata block 40. For example, the user may have changed the permissions on the file. Instead or additionally, the user may have manually changed the timestamp in the last modified date field or date created field—without having made any changes to the actual file content of the corresponding file. For example, the date modified field in the metadata record may indicate that the file was last modified on Oct. 7, 2017. The user, however, may change the timestamp to a different date, e.g., Feb. 3, 2013.

The CBT driver may then register block 40 as having been changed, but will not register as changed any of the one or more data blocks storing the actual file content because these data blocks have not been modified. This change detail is shown in FIG. 6 using a fill pattern having diagonal lines slopping to the right. Specifically, block 40 is shown with a fill pattern having diagonal lines slopping to the right to indicate that the block is a modified metadata block having updated metadata (e.g., updated timestamp).

There may be any number of reasons why a user may wish to adjust the timestamp metadata of a file. The reasons may be malicious or non-malicious. For example, some backup applications rely on the last modified date of a file to determine whether or not the file should be included in a present backup. If the last modified date of the file is before a date of a previous backup, the file may not be selected for inclusion in a present backup. If the last modified date of the file is after the date of the previous backup, the file may be selected for inclusion in the present backup. In these cases, a user who modified a file without authorization may then attempt to cover his tracks by altering the last modified date of the file to a time before the previous backup. Backup applications that rely on the last modification dates for backup may then skip the file and not include the file in a backup because the backup application may assume that the file was not modified after the previous backup.

In an embodiment, however, the present backup system does not rely on the last modified dates for backups. Thus, an unscrupulous user will not be able to thwart the system by altering the last modified date. In this case, the CBT registers the one or more data blocks of the file as having been changed (despite the fact that the last modified date in the corresponding metadata record was altered) and the backup application copies the metadata record and one or more data blocks that have changed according to the CBT to the backup storage repository. The metadata records analyzer can quickly and efficiently analyze the metadata record and write to the journal the name of the file that was modified, blocks of the file that were modified, and so forth.

As discussed above, however, there may be non-malicious reasons for why a user may alter metadata in a file—without modifying the file content itself. For example, the user may wish to change permissions on the file. A user K may have read permissions on the file, but the file owner may wish to give user K write permissions to the file. When a modification is made to the metadata record, the last modified field in the metadata record may also be updated even though no changes may have been made to the content of the file.

As another example, some compliers check the last modified date of a source code file to determine whether or not the file should be processed into an executable. If a user has yet to complete working on the file, the user may not want the file to be compiled or recompiled just yet. In this case, the user may alter the last modified timestamp of the file to a date before a date the file was last compiled. This may then have the effect of the complier not selecting the file for processing because the compiler may assume that the file has already been processed based on the last modified timestamp being before the last compiled date.

Consider as another example, that block 94 is a metadata block that references blocks 143 and 144. Blocks 143 and 144 are data blocks storing file data for a file object represented by metadata block 94. In this example, the file is deleted. Metadata block 94 is registered as having been changed because the generation counter stored in the metadata block is incremented as a result of the file deletion and metadata block 94 may be flagged as being available to represent a new file. These change details are shown in FIG. 6 using a fill pattern having a grid and a fill pattern having diagonal cross hatching. Specifically, block 94 is shown with a fill pattern having a grid to indicate that the block is a metadata block having or corresponding to a deleted file. Blocks 143 and 144 are shown with a fill pattern having diagonal cross hatching to indicate that they are data blocks corresponding to a deleted file.

As discussed above, these change details are not reported by the CBT driver. Rather, the CBT driver merely reports blocks 19, 20, 40, 69-76, 94, and 153-157 as having been changed.

Referring back now to FIG. 4, in a step 420, the metadata record analyzer opens and reads superblocks of the file system to obtain locations of metadata records (metadata blocks) that represent file objects in the file system. The analyzer generates a second list that includes the locations of the metadata records (metadata blocks). For example, referring now to FIG. 6, blocks 3-6, i.e., the superblocks, are read to obtain the locations of the metadata blocks as being blocks 17-22, 35-41, and 94-104. In other words, the analyzer records the locations of the metadata blocks as being at block numbers 17-22, 35-41, and 94-104. Again, as discussed above, at this point in the algorithm the metadata blocks themselves are not read. Rather, the superblocks are read and the locations of the metadata blocks (as identified in the superblocks) are obtained.

In a step 425 (FIG. 4), the analyzer intersects (e.g., performs an intersect operation) of the first and second lists to generate or return a third list. The third list thus includes locations of blocks listed in both the first and second list. More particularly, the blocks listed in the third list thereby correspond to metadata records (metadata blocks) that have changed since the previous backup (e.g., first backup). In other words, the blocks listed in the third list are the changed metadata record or blocks as of the current backup. These metadata records may be referred to as current versions of the metadata records. Thus, any data block that was modified between the previous and current backup will correspond to a metadata record listed in the third list because the file system guarantees that if a data block is modified, the timestamp in the corresponding metadata record will be updated. The CBT will then register the data block and metadata record as having been changed.

Figure 7:
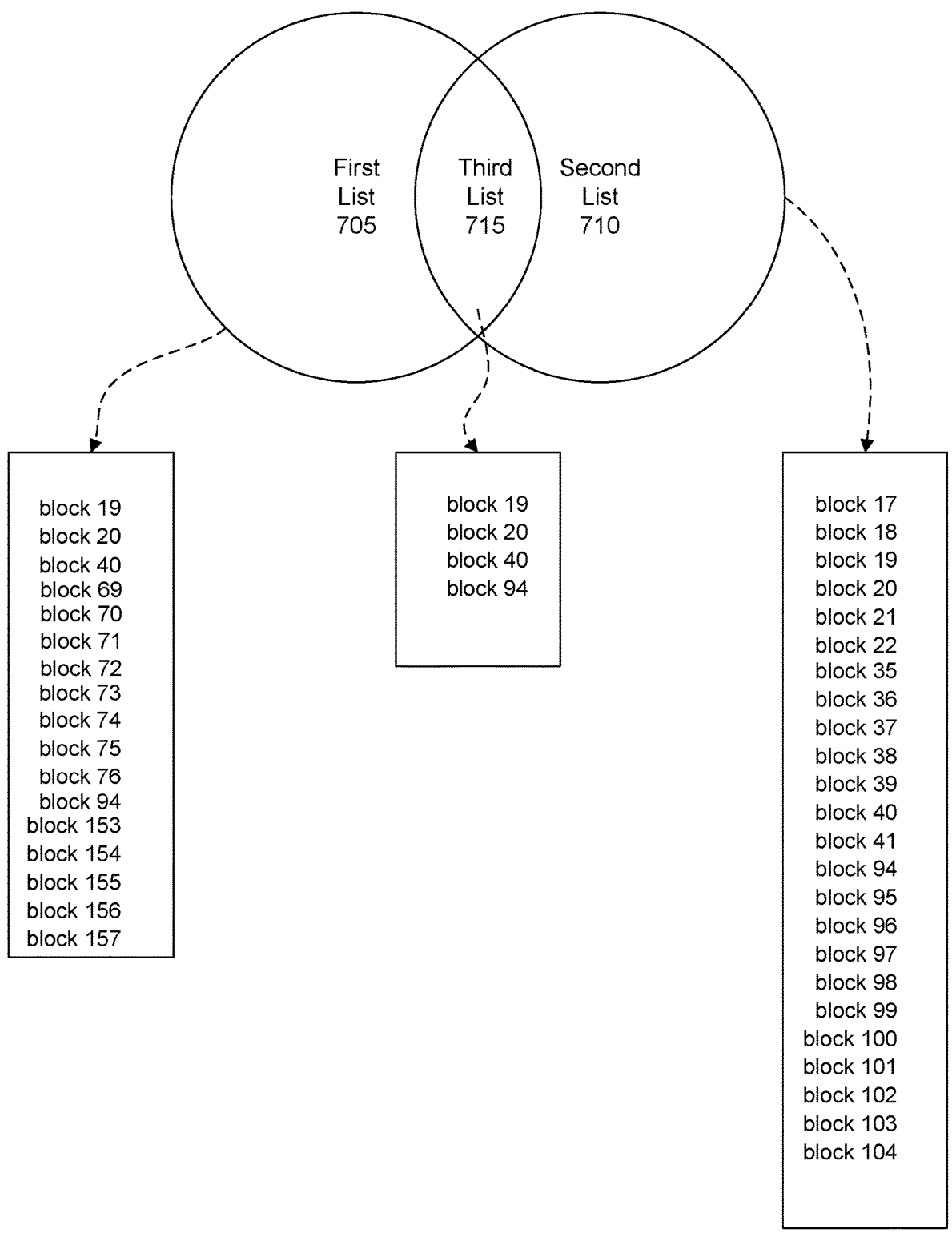
FIG. 7 shows an example of an intersection operation.

FIG. 7 shows a block diagram illustrating the intersection operation. As shown in the example of FIG. 7, there are first and second lists 705 and 710, respectively. In this example, the first list includes a listing of blocks that have changed between a current backup and a previous backup immediately before the current backup. Or, in other words, the blocks that have changed between backup intervals. According to the example shown in FIG. 6, the first list specifies blocks 19, 20, 40, 69, 70, 71, 72, 73, 74, 75, 76, 94, 153, 154, 155, 156, and 157. The second list includes a listing of blocks that are metadata blocks as specified by the superblocks. Thus, the second list specifies blocks 17, 18, 19, 20, 21, 22, 35, 36, 37, 38, 39, 40, 41, 94, 95, 96, 97, 98, 99, 100, 101, 102, 103, and 104.

The intersection between the first and second lists is calculated to generate a third list 715. For example, the first and second lists may be compared. A block is added to the resulting third list when the block is listed in both the first and second lists. In other words, if a block is listed in the first list, but is not listed in the second list, the block is not added to the third list. That is, the block is omitted or excluded from the third list. Similarly, if a block is listed in the second list, but is not listed in the first list, the block is not added to the third list.

In this example, the resulting third list includes blocks 19, 20, 40, and 94 as these are the blocks listed in both the first and second lists. The blocks listed in the third list will therefore be metadata records or blocks that have changed between the current and previous backups of the file system volume. Data blocks, regardless of whether or not they have changed between the current and previous backups, will be excluded or omitted from the third list. Likewise, metadata blocks that have not changed between the current and previous backups will also be excluded or omitted from the third list. The metadata blocks listed in the third list may be referred to as current version metadata blocks (or records).

Referring back now to FIG. 4, in a step 430, a current version of a metadata record as identified in the third list is read. In a step 435, a previous version of that metadata record as of the previous backup is read.

In a step 440, the current and previous versions of the metadata record are compared to detect a set of conditions occurring between the previous and current backups.

The comparison with metadata as of the previous backup helps to ensure: 1) That the file record in question wasn't both created and removed in the current backup. If a file was both created and removed in the current backup and never existed as of the previous backup, the file does not need to be indexed; and 2) To obtain the name of the file that was removed between the previous and current backup. In some cases, the metadata stored in the current record may be erased and thus may not be able to be used to obtain the file name of the file object that was removed.

In an embodiment, there are two types of conditions. Upon detecting that a first type of condition has occurred based on the comparison, the analyzer records in the journal information about the condition (step 445). Upon detecting that a second type of condition has occurred based on the comparison, the analyzer does not record in the journal information about the condition (step 450).

In a step 455, a determination is made as to whether the end of the third list has been reached. If there are any remaining metadata blocks (records) in the third list, the next metadata record is selected (step 460) and the process loops back 465 to step 430 to repeat steps 430-455 until the end of the third list is reached and each metadata record listed in the third list has been read. The blocks (or changed metadata blocks) listed in the third list may be read in any order.

In an embodiment, there can be four conditions that may potentially occur between the current and previous backups. A first condition occurs when a new file has been created between the current and previous backups. The first condition is categorized as a condition of the first type. Thus, information indicating that a new file has been created is recorded in the journal. A second condition occurs when a file, existing as of the previous backup, is deleted. The second condition is categorized as a condition of the first type. Thus, information indicating that a file has been deleted is recorded in the journal. A third condition occurs when a file is both created and deleted between the previous and current backups. The third condition is categorized as a condition of the second type. Thus, information indicating that a file was created and deleted between the previous and current backups will not be recorded in the journal. A fourth condition occurs when an existing file is modified. The fourth condition is categorized as a condition of the first type. Thus, information indicating that a file has been modified is recorded in the journal.

The previous version of the metadata record may be the penultimate version of the metadata record. That is, the previous version of the metadata record may be the second to last (or current) version of the metadata record. The previous version of the metadata record may be the next to last version of the metadata record. The previous version of the metadata record may be obtained from a backup immediately prior to the current backup. If, however, the previous version of the metadata record was not included in the backup immediately prior to the current backup (such as the case may be if there were no changes to the metadata record as of the backup immediately prior to the current backup), the previous version of the metadata record may be obtained from a backup earlier than the backup immediately prior to the current backup. For example, the previous version of the metadata record may be obtained from the initial full backup (such as the case may be if the metadata record remained unchanged up until the current backup). In other words, both versions of the metadata record may have the same metadata record number, have the same block location, have the same block number, or have the same block identifier, but one version is from the current backup and the other version is from a previous backup.

Thus, there can be metadata records from any number of different previous backups that are to be compared with their corresponding counterparts from the current backup. Consider, for example, that a series of backups includes a first backup at T1, a second backup at T2, after T1, and a third backup at T3, after T1 and T2. The third backup is a current backup. The first and second backups are previous backups.

The first backup includes first and second metadata records. The second backup includes the first metadata record because the first metadata record changed between the first and second backups. The second backup does not include the second metadata record because the second metadata record did not change between the first and second backups. The third or current backup includes the first and second metadata records because the first and second metadata records changed between the second and third backups.

In this example, a current version of the first metadata record from the third backup is compared against a previous version of the first metadata record from the second backup because this is the penultimate version of the first metadata record.

A current version of the second metadata record from the third backup is compared against a previous version of the second metadata record from the first backup because this is the penultimate version of the second metadata record as the second metadata record was not included in the second backup because the second metadata record did not change between the first and second backups.

Figure 8:
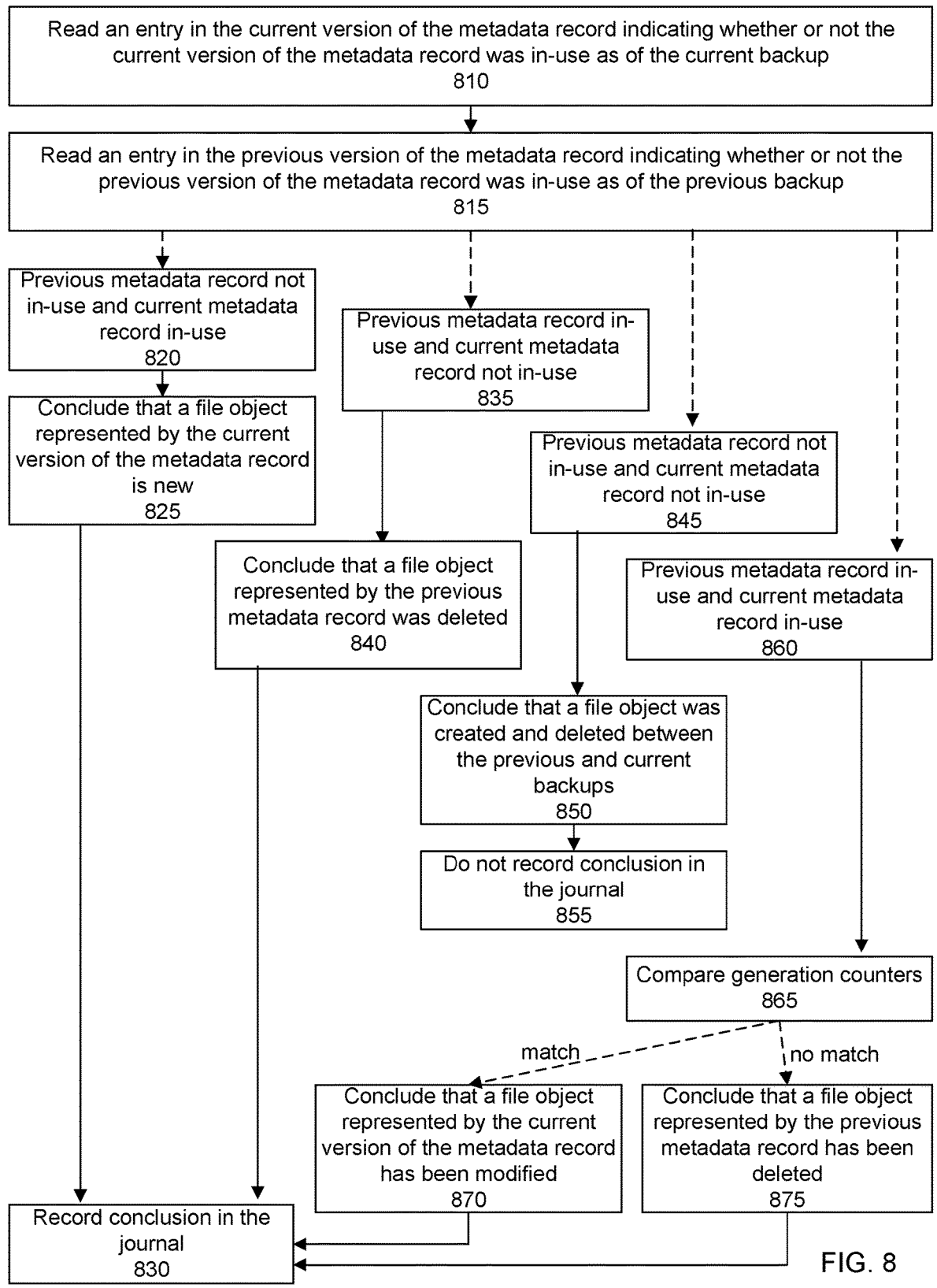
FIG. 8 shows further detail of a flow for comparing metadata records as of a current backup with corresponding metadata records as of a previous backup, under some embodiments.

FIG. 8 shows further detail of a flow for the metadata record comparison analysis. In a step 810, the metadata records analyzer reads an entry (e.g., in-use flag) in a current version of a metadata record that indicates whether or not the current version of the metadata record was in-use as of the current backup.

In a step 815, the analyzer reads an entry (e.g., in-use flag) in a previous version of the metadata record that indicates whether or not the previous version of the metadata record was in-use as of the previous backup.

If the previous version of the metadata record is not in-use and the current version of the metadata record is in-use (step 820), the analyzer concludes that a file object represented by the current version of the metadata record is new (step 825).

In a step 830, information about the conclusion is recorded in the journal. For example, in an embodiment, upon concluding that the file object represented by the current version of the metadata record is new, the analyzer may proceed to read other fields in the current version of the metadata record to obtain further detail on the new file. The further reading may include reading a block map of the current version of the metadata record and identifying, from the block map, one or more data blocks associated with the current version of the metadata record in which content of the new file resides. The locations of the one or more data blocks and name of the new file may be recorded in the journal. The journal may be provided to the indexer so that the indexer may read and index the contents stored in the one or more data blocks.

Alternatively, if the previous version of the metadata record is in-use and the current version of the metadata record is not in-use (step 835), the analyzer concludes that there was a file object existing as of the previous backup, but was deleted by the time of the current backup (step 840). Information about the conclusion is recorded in the journal. The recorded information may include, for example, a name of the file that was deleted. The name of the file that was deleted may be obtained from the previous version of the metadata record because the file name field in the current version of the metadata record may have been deleted with the deletion of the file. This technique thus allows for determining and identifying which file was deleted without having to consult all the metadata records that may be present in the file system.

Alternatively, if the previous version of the metadata record is not in-use and the current version of the metadata record is not in-use (step 845), the analyzer concludes that a file object was created and deleted between the previous and current backups (step 850). In other words, the file object was not in existence as of the previous backup, the file object was created after the previous backup (and thus also had an associated metadata record that was registered by the CBT), and was deleted before the current backup (which is why the metadata record had been flagged as not in-use). In this case, the file may be temporary file.

In this specific embodiment, the analyzer does not record the conclusion in the journal (step 855). That is, the analyzer will not record in the journal an indication that there was a file created and deleted between the previous and current backups because the file is a temporary file. In another specific embodiment, there can be a user-configurable setting in which the user may configure the system to record information about the conclusion in the journal.

Alternatively, if the previous version of the metadata record is in-use and the current version of the metadata record is in-use (step 860), the analyzer compares the generation counters from the previous version and current version metadata records (step 865). That is, a generation counter from the previous version of the metadata record is compared with a generation counter from the current version of the metadata record.

If the generation counters match, in a step 870, the analyzer concludes that a file object represented by the current version of the metadata record has been modified. The conclusion is recorded in the journal (step 830). For example, the analyzer may proceed to read the rest of the metadata record to obtain the identifications or locations of one or more data blocks referenced by the current version of the metadata record. The data block identifiers for the one or more data blocks may then be compared with the listing of changed blocks registered by the CBT for the current backup. This allows an identification of the particular blocks of the one or more data blocks that were modified between the previous and current backups. The identification of these particular blocks may be recorded in the journal along with the name of the file that was modified. The journal can then be provided to the indexer so that the indexer can read the changed blocks associated with the file and index their contents.

If the generation counters do not match, in a step 875, the analyzer concludes that a first file object was in existence as of the previous backup and was deleted before the current backup. The conclusion may then be recorded in the journal.

For example, the analyzer may record in the journal a name of the first file object and an indication that it was deleted.

The analyzer may further conclude that a second file object, different from the first file object, was created after the previous backup and is being represented by the current version of the metadata record. The conclusion may likewise be recorded in the journal. For example, the analyzer may record in the journal a name of the second file object, a mapping of the data blocks storing content of the second file object, and an indication that the second file object is new. The journal may be provided to an indexer so that the indexer can index the contents of the data blocks.

Table C below shows an example of a decision matrix summarizing the conditions shown in FIG. 8. The decision matrix may be stored and consulted by the metadata records analyzer to determine what specific conditions or events occurred between the current and previous backups.

TABLE C

| Previous Metadata Record | Current Metadata Record | Decision |
| --- | --- | --- |
| not in-use | in-use | new file created between the previous and current backups |
| in-use | not in-use | existing file deleted between the previous and current backups |
| not in-use | not in-use | new file created and deleted between the previous and current backups |
| in-use | in-use | compare generation counters; if matching, conclude an existing file was modified between the previous and current backups; if not matching, conclude that a file was deleted and the current metadata record is being reused to represent a new different file |

The processes shown in FIGS. 4 and 8 allow for identifying files included in a current backup and file changes between block-based backups by examining the modified blocks of a current backup. The examination technique allows for identifying the files corresponding to the changed blocks without having to consult and process each and every metadata record (or metadata block or file record) in the file system. The relationship of the changed data blocks can be very quickly and efficiently mapped to their corresponding files.

Metadata records of the file system as of a current backup are not read unless they have been listed in the resulting intersection of the first list having the changed block locations and second list having the metadata records locations. That is, metadata records of the file system as of the current backup and not listed in the resulting intersection of the first and second lists may be excluded or omitted from being read. The mapping between the blocks that have been backed up and their corresponding files can be discovered for cataloging and indexing without having to mount the backed up file system and read through each and every file record.

A file system may include many millions upon millions of files. Consider, as an example, that just one block has been changed which belongs to just one file. A technique of the system allows for identifying that one file without having to consult the many different file records in the file system. Thus, the time and processing required to identify the relationship between changed blocks and their corresponding files is no longer a function of the total number of files in the file system. Rather, the required time and processing can be proportional to the number of changed blocks.

In an embodiment, a technique for detecting a metadata change only includes reading a metadata record as listed in the third list and included in a current backup, extracting a layout of data blocks referenced in the metadata record, comparing block identifiers of the data blocks from the layout with block identifiers listed in a changed block list from the current backup, determining that there are no matching block identifiers, concluding that a change was only a metadata change, comparing the metadata record with a corresponding metadata record as of a previous backup to determine differences in metadata between the metadata record associated with the current backup and the corresponding metadata record as of the previous backup, and recording the differences in a journal. The differences may include, for example, a change in the filename, a change in permissions, other metadata changes, or combinations of these.

In a specific embodiment, a method includes step 1.1 after an incremental block-based backup of a file system has completed, receiving a first list comprising locations of blocks backed up during the incremental block-based backup, the blocks identified in the first list being blocks that have changed since a previous backup; step 1.2 reading superblocks of the file system to generate a second list comprising locations of certain metadata records that represent file objects in the file system, the metadata records being anchor points representative of file objects within the file system, a file object comprising content stored in one or more blocks, and the metadata record associated with the file object comprising metadata that identifies locations of the one or more blocks of the file object along with other properties of the file object; step 1.3 intersecting the first and second lists to generate a third list comprising a subset of the block locations identified in the first list, the blocks identified in the subset thereby corresponding to metadata records representing file object anchor points of those files that have changed since the previous backup and were backed up during the incremental block-based backup; step 1.4 reading each metadata record as identified in the third subset; step 1.5 extracting, from each metadata record so read, a layout of the file object when considering each such metadata record as anchor point representing a file object; step 1.6 recording the location of content blocks of such file objects in a journal while step 1.7 repeating the reading, extracting, and recording for each metadata record identified in the third subset and step 1.8 intersecting those blocks in the first list that are absent in the second list but exist in the journal of content blocks of each file object represented by metadata blocks in third list and storing them in a changed file journal that represents a list of modified files in the current incremental backup and step 1.9 repeating the extraction and recording of such changed file block locations for each file object in the third list with the exception of step 1.10 detecting when a metadata block as present in the third list represents a new file or removed file by comparing metadata of the file object with its previous version and representing the entire file as new or deleted as the case may be for the current incremental block-based backup and step 1.11 identifying those metadata blocks from the third list that do not represent removed or new files but have no content blocks that intersect the first list and marking the file object as represented by the said metadata block as a metadata-change only file object (a file object whose metadata was updated since the previous backup but not the file content) and representing the said file object as a metadata-change only file in the current block based incremental backup; step 1.12 and repeating steps 1.8 to 1.11 for each metadata object in the third list.

In a specific embodiment, a folder object is only checked for creates and deletes. If a metadata object represents a folder and was created (or deleted) in the current incremental backup, the folder name is marked as such in the index for the file system. File creates/deletes within a folder report themselves and therefore no special processing is required for folder objects. All content blocks of a folder metadata object are ignored if they were marked as modified in the changed block list.

In a specific embodiment, a method includes: allowing an incremental block-based backup of a file system to complete, the backup being a current backup; receiving, after the allowing, a first list comprising locations of blocks that have changed between a previous backup and the current backup; reading superblocks of the file system to generate a second list comprising locations of metadata records representing file objects in the file system, wherein a file object comprises content stored in one or more data blocks, and a metadata record, represented by the file object, comprises metadata that identifies locations of the one or more data blocks, and other attributes of the file object; intersecting the first and second lists to return a third list comprising locations listed in both the first and second lists, the locations listed in the third list thereby corresponding to metadata records that have changed between the previous and current backups; reading a metadata record identified in the third list, the metadata record identified in the third list being a current version of the metadata record; reading another version of the metadata record as of the previous backup, the other version thereby being a previous version of the metadata record; comparing the current and previous versions of the metadata records to detect a plurality of conditions occurring between the previous and current backups; upon detecting that a first type of condition has occurred, recording, in a journal, information about a condition of the first type; and upon detecting that a second type of condition has occurred, not recording, in the journal, information about a condition of the second type.

Detecting that a first type of condition has occurred may include reading an entry in the previous version of the metadata record indicating that the previous version of the metadata record was not in-use as of the previous backup; reading an entry in the current version of the metadata record indicating that the current version of the metadata record was in-use as of the current backup; concluding that a particular file object represented by the current version of the metadata record is new; and recording, in the journal, information about the particular file object having been newly created.

Detecting that a first type of condition has occurred may include: reading an entry in the previous version of the metadata record indicating that the previous version of the metadata record was in-use as of the previous backup; reading an entry in the current version of the metadata record indicating that the current version of the metadata record was not in-use as of the current backup; concluding that a particular file object represented by the previous version of the metadata record was deleted; and recording, in the journal, information about the particular file object having been deleted.

Detecting that a second type of condition has occurred may include reading an entry in the previous version of the metadata record indicating that the previous version of the metadata record was not in-use as of the previous backup; reading an entry in the current version of the metadata record indicating that the current version of the metadata record was not in-use as of the current backup; concluding that a particular file object represented by the current version of the metadata record was created and deleted between the previous and current backups of the file system; and not recording, in the journal, information about the particular file object having been created and deleted between the previous and current backups.

Detecting that a first type of condition has occurred may include reading an entry in the previous version of the metadata record indicating that the previous version of the metadata record was in-use as of the previous backup; reading an entry in the current version of the metadata record indicating that the current version of the metadata record was in-use as of the current backup; comparing a generation counter stored in the previous version of the metadata record and a generation counter stored in the current version of the metadata record to determine whether or not the generation counters match; if the generation counters match, determining that a first file object represented by the current version of the metadata record has been modified and recording, in the journal, information about the first file object having been modified; and if the generation counters do not match, determining that a second file object represented by the previous version of the metadata record has been deleted and recording, in the journal, information about the second file object having been deleted.

In an embodiment, all the metadata records identified in the third list have been backed up during the current backup before the intersecting.

In another specific embodiment, there is a system to detect file changes between block-based backups, the system including: a processor-based system executed on a computer system and configured to execute instructions including: allowing an incremental block-based backup of a file system to complete, the backup being a current backup; receiving, after the allowing, a first list comprising locations of blocks that have changed between a previous backup and the current backup; reading superblocks of the file system to generate a second list comprising locations of metadata records representing file objects in the file system, wherein a file object comprises content stored in one or more data blocks, and a metadata record, represented by the file object, comprises metadata that identifies locations of the one or more data blocks, and other attributes of the file object; intersecting the first and second lists to return a third list comprising locations listed in both the first and second lists, the locations listed in the third list thereby corresponding to metadata records that have changed between the previous and current backups; reading a metadata record identified in the third list, the metadata record identified in the third list being a current version of the metadata record; reading another version of the metadata record as of the previous backup, the other version thereby being a previous version of the metadata record; comparing the current and previous versions of the metadata records to detect a plurality of conditions occurring between the previous and current backups; upon detecting that a first type of condition has occurred, recording, in a journal, information about a condition of the first type; and upon detecting that a second type of condition has occurred, not recording, in the journal, information about a condition of the second type.

In another specific embodiment, there is a computer program product, comprising a non-transitory computer-readable medium having a computer-readable program code embodied therein, the computer-readable program code adapted to be executed by one or more processors to implement a method comprising: allowing an incremental block-based backup of a file system to complete, the backup being a current backup; receiving, after the allowing, a first list comprising locations of blocks that have changed between a previous backup and the current backup; reading superblocks of the file system to generate a second list comprising locations of metadata records representing file objects in the file system, wherein a file object comprises content stored in one or more data blocks, and a metadata record, represented by the file object, comprises metadata that identifies locations of the one or more data blocks, and other attributes of the file object; intersecting the first and second lists to return a third list comprising locations listed in both the first and second lists, the locations listed in the third list thereby corresponding to metadata records that have changed between the previous and current backups; reading a metadata record identified in the third list, the metadata record identified in the third list being a current version of the metadata record; reading another version of the metadata record as of the previous backup, the other version thereby being a previous version of the metadata record; comparing the current and previous versions of the metadata records to detect a plurality of conditions occurring between the previous and current backups; upon detecting that a first type of condition has occurred, recording, in a journal, information about a condition of the first type; and upon detecting that a second type of condition has occurred, not recording, in the journal, information about a condition of the second type.

In a specific embodiment, a first list is received including locations of blocks of a file system that changed between current and previous backups. A superblock of the file system is read to generate a second list including locations of metadata records representing file objects. The first and second lists are intersected to return a third list including locations listed in the first and second lists. The locations in the third list are changed metadata records. A metadata record as of the current backup and identified in the third list is read. A previous version of the metadata record as of the previous backup is read. The current and previous metadata record versions are compared to detect potential conditions occurring between the backups. Upon detection of a first type of condition, information about the condition. Upon detection of a second type of condition, information about the condition is not recorded in the journal.

Figure 9:
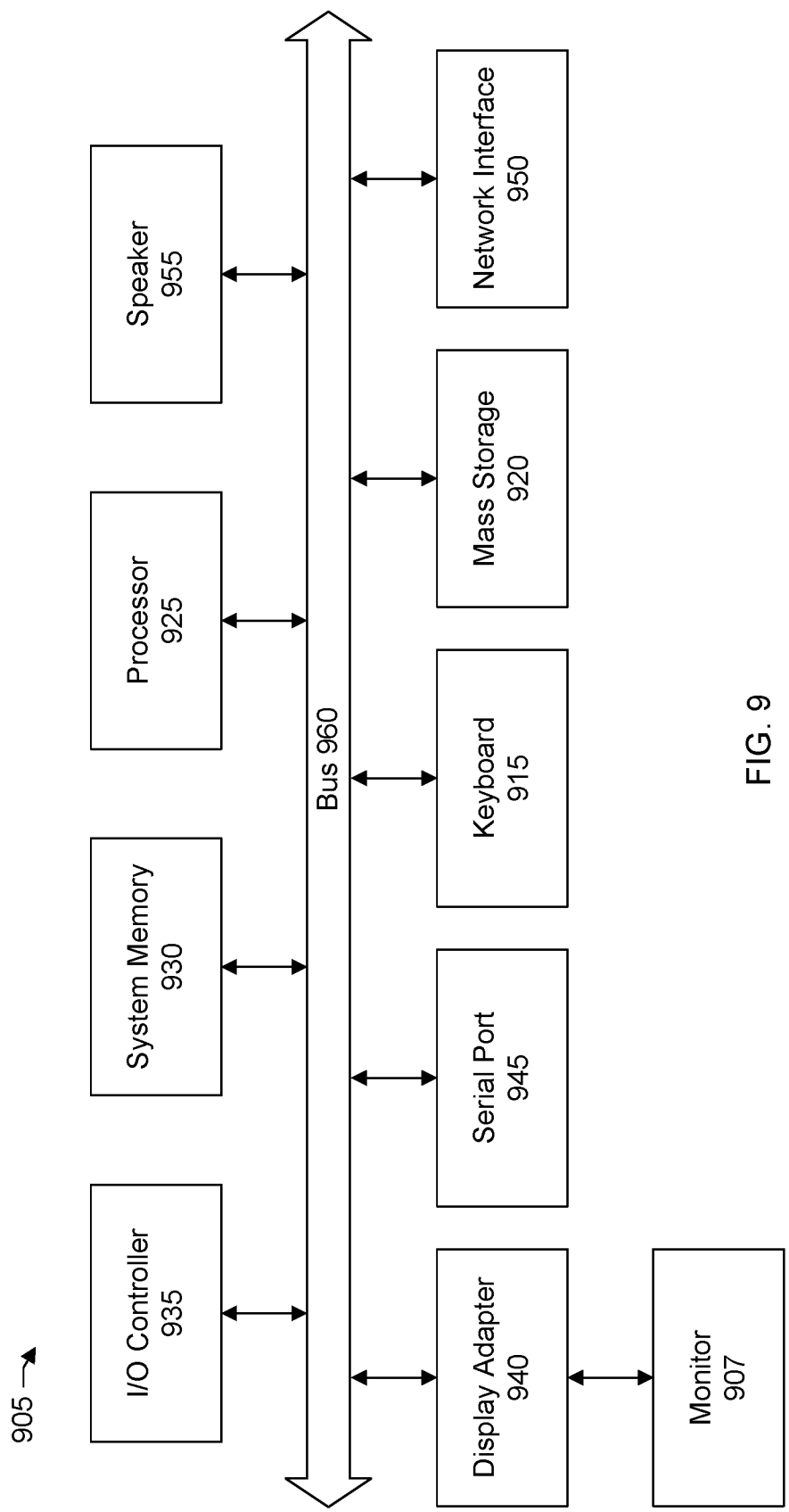
FIG. 9 shows a block diagram of a computer system suitable for use with the system, under some embodiments.

FIG. 9 shows a system block diagram of a computer system 905 used to execute the software of the present system described herein. The computer system includes a monitor 907, keyboard 915, and mass storage devices 920. Computer system 905 further includes subsystems such as central processor 925, system memory 930, input/output (I/O) controller 935, display adapter 940, serial or universal serial bus (USB) port 945, network interface 950, and speaker 955. The system may also be used with computer systems with additional or fewer subsystems. For example, a computer system could include more than one processor 925 (i.e., a multiprocessor system) or a system may include a cache memory.

Arrows such as 960 represent the system bus architecture of computer system 905. However, these arrows are illustrative of any interconnection scheme serving to link the subsystems. For example, speaker 955 could be connected to the other subsystems through a port or have an internal direct connection to central processor 925. The processor may include multiple processors or a multicore processor, which may permit parallel processing of information. Computer system 905 shown in FIG. 9 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A method for indexing contents of an incremental block-based backup of a volume having a file system comprising:

allowing the incremental block-based backup of the volume to complete, the incremental backup being a most recent backup and comprising storing on backup storage all blocks of the volume that have changed since a previous backup according to a changed block list generated by a change block tracking (CBT) driver that intercepts writes from the file system;

after the most recent incremental backup has completed, obtaining the changed block list used for the most recent incremental backup, the changed block list being a first list;

reading superblocks of the file system to generate a second list identifying metadata blocks at which metadata records associated with files of the file system are stored;

intersecting the first and second lists to return a third list identifying changed metadata blocks, the changed metadata blocks thereby corresponding to metadata records that have changed between the previous and most recent backups;

reading a changed metadata record, the changed metadata record being a current version of the changed metadata record;

reading another version of the changed metadata record as of the previous backup, the other version thereby being a previous version of the changed metadata record;

comparing the current and previous versions of the changed metadata records to detect events that occurred between the previous and most recent backups;

upon detecting that an event of a first type has occurred, recording, in a journal, information about the event of the first type, wherein the journal is different from the changed block list generated by the CBT driver; and upon detecting that an event of a second type has occurred, not recording, in the journal, information about the event of the second type, wherein the event of the second type comprises a creation of a file after the previous backup and a deletion of the file before the most recent backup, wherein the detecting that the event of a first type has occurred further comprises:

reading an entry for a file object in the previous version of the changed metadata record, wherein an in-use flag field in the previous version of the changed metadata record comprises a value indicating that the previous version of the changed metadata record was in-use as of the previous backup;

reading an entry for a file object in the current version of the changed metadata record, wherein an in-use flag field in the current version of the changed metadata record comprises a value indicating that the current version of the changed metadata record was in-use as of the most recent backup;

comparing a generation counter value stored in a generation counter field of the previous version of the changed metadata record and a generation counter value stored in a generation counter field of the current version of the changed metadata record to determine whether or not the generation counter values match;

if the generation counter values match, determining that the file object associated with the current version of the changed metadata record has been modified and recording, in the journal, information about the file object having been modified; and if the generation counter values do not match, determining that the file object associated with the previous version of the changed metadata record has been deleted and recording, in the journal, information about the file object having been deleted.

2. The method of claim 1 wherein the detecting that the event of a first type has occurred further comprises:

reading an entry for a file object in the previous version of the changed metadata record, wherein an in-use flag field in the previous version of the changed metadata record comprises a value indicating that the previous version of the changed metadata record was not in-use as of the previous backup;

reading an entry for a file object in the current version of the changed metadata record, wherein an in-use flag field in the current version of the changed metadata record comprises a value indicating that the current version of the changed metadata record was in-use as of the most recent backup;

determining that the file object associated with the current version of the changed metadata record is new; and recording, in the journal, information about the file object having been newly created.

3. The method of claim 1 wherein the detecting that the event of a first type has occurred further comprises:

reading an entry for a file object in the previous version of the changed metadata record, wherein an in-use flag field in the previous version of the changed metadata record comprises a value indicating that the previous version of the changed metadata record was in-use as of the previous backup;

reading an entry for a file object in the current version of the changed metadata record, wherein an in-use flag field in the previous version of the changed metadata record comprises a value indicating that the current version of the changed metadata record was not in-use as of the most recent backup;

determining that the file object associated with the previous version of the changed metadata record was deleted; and recording, in the journal, information about the file object having been deleted.

4. The method of claim 1 wherein the detecting that the event of a second type has occurred further comprises:

reading an entry for a file object in the previous version of the changed metadata record, wherein an in-use flag field in the previous version of the changed metadata record comprises a value indicating that the previous version of the changed metadata record was not in-use as of the previous backup;

reading an entry for a file object in the current version of the changed metadata record, wherein an in-use flag field in the current version of the changed metadata record comprises a value indicating that the current version of the changed metadata record was not in-use as of the most recent backup;

determining that the file object associated with the current version of the changed metadata record was created and deleted between the previous and most recent backups of the volume; and not recording, in the journal, information about the file object having been created and deleted between the previous and most recent backups.

5. The method of claim 1 wherein all the blocks of the volume that have changed since the previous backup are backed up during the most recent backup before the intersecting.

6. A system to detect file changes between block-based backups for indexing contents of an incremental block-based backup of a volume having a file system, the system comprising:

a processor-based system executed on a computer system and configured to execute instructions comprising:

allowing the incremental block-based backup of the volume to complete, the incremental backup being a current backup and comprising storing on backup storage all blocks of the volume that have changed since a previous backup according to a changed block list generated by a change block tracking (CBT) driver that intercepts writes from the file system;

after the incremental backup has completed,
   obtaining the changed block list, the changed block list being a first list;
   reading superblocks of the file system to generate a second list identifying metadata blocks at which metadata records associated with files of the file system are stored;
   intersecting the first and second lists to return a third list identifying changed metadata blocks, the changed metadata blocks thereby corresponding to metadata records that have changed between the previous and current backups;
   reading a changed metadata record, the changed metadata record being a current version of the changed metadata record;
   reading another version of the changed metadata record as of the previous backup, the other version thereby being a previous version of the changed metadata record;
   comparing the current and previous versions of the changed metadata records to detect events that occurred between the previous and current backups;
   upon detecting that an event of a first type has occurred, recording, in a journal, information about the event of the first type, wherein the journal is separate from the changed block list generated by the CBT driver; and
   upon detecting that an event of a second type has occurred, not recording, in the journal, information about the event of the second type, wherein the event of the second type comprises a creation of a file after the previous backup and a deletion of the file before the current backup, wherein the detecting that the event of a first type has occurred further comprises:

reading an entry for a file object in the previous version of the changed metadata record, wherein an in-use flag field in the previous version of the changed metadata record comprises a value indicating that the previous version of the changed metadata record was in-use as of the previous backup;

reading an entry for a file object in the current version of the changed metadata record, wherein an in-use flag field in the current version of the changed metadata record comprises a value indicating that the current version of the changed metadata record was in-use as of the current backup;

comparing a generation counter value stored in a generation counter field of the previous version of the changed metadata record and a generation counter value stored in a generation counter field of the current version of the changed metadata record to determine whether or not the generation counter values match;

if the generation counter values match, determining that the file object associated with the current version of the changed metadata record has been modified and recording, in the journal, information about the file object having been modified; and if the generation counter values do not match, determining that the file object associated with the previous version of the changed metadata record has been deleted and recording, in the journal, information about the file object having been deleted.

7. The system of claim 6 wherein the detecting that the event of a first type has occurred further comprises:

reading an entry for a file object in the previous version of the changed metadata record, wherein an in-use flag in the previous version of the changed metadata record comprises a value indicating that the previous version of the changed metadata record was not in-use as of the previous backup;

reading an entry for a file object in the current version of the changed metadata record, wherein an in-use flag in the current version of the changed metadata record comprises a value indicating that the current version of the changed metadata record was in-use as of the current backup;

determining that the file object associated with the current version of the changed metadata record is new; and recording, in the journal, information about the file object having been newly created.

8. The system of claim 6 wherein the detecting that the event of a first type has occurred further comprises:

reading an entry for a file object in the previous version of the changed metadata record, wherein an in-use flag field in the previous version of the changed metadata record comprises a value indicating that the previous version of the changed metadata record was in-use as of the previous backup;

reading an entry for a file object in the current version of the changed metadata record, wherein an in-use flag field in the current version of the changed metadata record comprises a value indicating that the current version of the changed metadata record was not in-use as of the current backup;

determining that the file object associated with the previous version of the changed metadata record was deleted; and recording, in the journal, information about the file object having been deleted.

9. The system of claim 6 wherein the detecting that the event of a second type has occurred further comprises:

reading an entry for a file object in the previous version of the changed metadata record, wherein an in-use flag field in the previous version of the changed metadata record comprises a value indicating that the previous version of the changed metadata record was not in-use as of the previous backup;

reading an entry for a file object in the current version of the changed metadata record, wherein an in-use flag field in the current version of the changed metadata record comprises a value indicating that the current version of the changed metadata record was not in-use as of the current backup;

determining that the file object associated with the current version of the changed metadata record was created and deleted between the previous and current backups of the volume; and not recording, in the journal, information about the file object having been created and deleted between the previous and current backups.

10. The system of claim 6 wherein all the blocks of the volume that have changed since the previous backup are backed up during the current backup before the intersecting.

11. A computer program product, comprising a non-transitory computer-readable medium having a computer-readable program code embodied therein, the computer-readable program code adapted to be executed by one or more processors to implement a method for indexing contents of an incremental block-based backup of a volume having a file system, the method comprising:

allowing the incremental block-based backup of the volume to complete, the incremental backup being a current backup and comprising storing on backup storage all blocks of the volume that have changed since a previous backup according to a changed block list generated by a change block tracking (CBT) driver that intercepts writes from the file system;

after the incremental backup has completed,
  obtaining the changed block list, the changed block list being a first list;
  reading superblocks of the file system to generate a second list identifying metadata blocks at which metadata records associated with files of the file system are stored;
  intersecting the first and second lists to return a third list identifying changed metadata blocks, the changed metadata blocks thereby corresponding to metadata records that have changed between the previous and current backups;
  reading a changed metadata record, the changed metadata record being a current version of the changed metadata record;
  reading another version of the changed metadata record as of the previous backup, the other version thereby being a previous version of the changed metadata record;
  comparing the current and previous versions of the changed metadata records to detect events that occurred between the previous and current backups;
  upon detecting that an event of a first type has occurred, recording, in a journal, information about the event of the first type, wherein the journal is stored separate from the changed block list; and
  upon detecting that an event of a second type has occurred, not recording, in the journal, information about the event of the second type, wherein the event of the second type comprises a creation of a file after the previous backup and a deletion of the file before the current backup, wherein the detecting that the event of a first type has occurred further comprises:
reading an entry for a file object in the previous version of the changed metadata record, wherein an in-use flag field in the previous version of the changed metadata record comprises a value indicating that the previous version of the changed metadata record was in-use as of the previous backup;
reading an entry for a file object in the current version of the changed metadata record, wherein an in-use flag field in the current version of the changed metadata record comprises a value indicating that the current version of the changed metadata record was in-use as of the current backup;
comparing a generation counter value stored in a generation counter field of the previous version of the changed metadata record and a generation counter value stored in a generation counter field of the current version of the changed metadata record to determine whether or not the generation counter values match;
if the generation counter values match, determining that the file object associated with the current version of the changed metadata record has been modified and recording, in the journal, information about the file object having been modified; and
if the generation counter values do not match, determining that the file object associated with the previous version of the changed metadata record has been deleted and recording, in the journal, information about the file object having been deleted.

12. The computer program product of claim 11 wherein the detecting that the event of a first type has occurred further comprises:
  reading an entry for a file object in the previous version of the changed metadata record, wherein an in-use flag field in the previous version of the changed metadata record comprises a value indicating that the previous version of the changed metadata record was not in-use as of the previous backup;
  reading an entry for a file object in the current version of the changed metadata record, wherein an in-use flag field in the current version of the changed metadata record comprises a value indicating that the current version of the changed metadata record was in-use as of the current backup;
  determining that the file object associated with the current version of the changed metadata record is new; and
  recording, in the journal, information about the file object having been newly created.

13. The computer program product of claim 11 wherein the detecting that an event of a first type has occurred further comprises:
  reading an entry for a file object in the previous version of the changed metadata record, wherein an in-use flag field in the previous version of the changed metadata record comprises a value indicating that the previous version of the changed metadata record was in-use as of the previous backup;
  reading an entry for a file object in the current version of the changed metadata record, wherein an in-use flag field in the current version of the changed metadata record comprises a value indicating that the current version of the changed metadata record was not in-use as of the current backup;
  determining that the file object associated with the previous version of the changed metadata record was deleted; and
  recording, in the journal, information about the file object having been deleted.

14. The computer program product of claim 11 wherein the detecting that the event of a second type has occurred further comprises:
  reading an entry for a file object in the previous version of the changed metadata record, wherein an in-use flag field in the previous version of the changed metadata record comprises a value indicating that the previous version of the changed metadata record was not in-use as of the previous backup;
  reading an entry for a file object in the current version of the changed metadata record, wherein an in-use flag field in the current version of the changed metadata record comprises a value indicating that the current version of the changed metadata record was not in-use as of the current backup;
  determining that the file object associated with the current version of the changed metadata record was created and deleted between the previous and current backups of the volume; and
  not recording, in the journal, information about the file object having been created and deleted between the previous and current backups.

15. The computer program product of claim 11 wherein all the blocks of the volume that have changed since the previous backup are backed up during the current backup before the intersecting.

* * * * *